(12) United States Patent
Perander et al.

(10) Patent No.: US 6,599,388 B1
(45) Date of Patent: Jul. 29, 2003

(54) METHOD FOR MANUFACTURING A BINDER AND USE THEREOF

(75) Inventors: Michael Perander, Pargas (FI); Bob Talling, Åbo (FI); Jean Le Bell, S:T Karins (FI)

(73) Assignee: Paroc Group Oy AB, Vantaa (FI)

( * ) Notice: Subject to any disclaimer, the term of this patent is extended or adjusted under 35 U.S.C. 154(b) by 35 days.

(21) Appl. No.: 09/763,358

(22) PCT Filed: Jun. 20, 2000

(86) PCT No.: PCT/FI00/00548

§ 371 (c)(1),
(2), (4) Date: Mar. 28, 2001

(87) PCT Pub. No.: WO01/00916

PCT Pub. Date: Jan. 4, 2001

(30) Foreign Application Priority Data

Jun. 24, 1999 (FI) .................................................. 991439
Oct. 1, 1999 (FI) .................................................. 992124

(51) Int. Cl.⁷ ........................... D04H 1/64; D21H 13/40
(52) U.S. Cl. ...................... 156/325; 156/62.2; 264/128; 516/78; 516/81
(58) Field of Search .................................. 264/128, 109; 156/325; 516/78, FOR 115, 81; 186/296, 62.2

(56) References Cited

U.S. PATENT DOCUMENTS 3,649,406 A * 3/1972 McNish ...................... 156/325
3,976,728 A * 8/1976 Hawthorne .................. 264/128

FOREIGN PATENT DOCUMENTS

| EP | 0059 088 A1 | 9/1982 | |
|----|----|----|----|
| EP | 0 476 176 A1 | 3/1992 | |
| FI | 60667 | 6/1976 | |
| FI | 853682 | 3/1986 | |
| FI | 100115 B | 10/1991 | |
| JP | 49-54442 | * 5/1974 | ................. 156/325 |
| WO | WO 98/49116 | 11/1998 | |

* cited by examiner

Primary Examiner—Sam Chuan Yao
(74) Attorney, Agent, or Firm—Armstrong, Westerman & Hattori, LLP

(57) ABSTRACT

The invention concerns a method for making a binder, especially for mineral wool products comprising the steps of dissolving a particulate mineral material having a glassy amnorphous structure in an aqueous solution, nucleating and stabilizing the so obtained solution to form a sol having the desired particle size, and optionally adjusting the dry matter content of the sol. The invention also concerns a method for the production of a mineral wool product using the said binder for binding the fibers.

25 Claims, No Drawings

METHOD FOR MANUFACTURING A BINDER AND USE THEREOF

FIELD OF THE INVENTION

The object of the present invention is a method for making a binder by using, as the starting material, a particulate mineral material with a glassy amorphous structure, especially a waste material from mineral wool production. Such a binder is suitable for binding mineral materials, especially for use as a binder in the manufacture of mineral wool products from mineral fibres. Another object of the present invention is a method for manufacturing mineral wool products using the said binder for binding the mineral fibres.

BACKGROUND OF THE INVENTION (Mineral fibres made by melting and centrifuging of mineral raw materials, such as stone, slag, glass, ceramics or the like,) are extensively used for the manufacture of mineral fibre mats and blankets, primarily for heat and sound insulation purposes, especially within the construction industry. Such mineral fibre products conventionally contain a binder, of which a number of different types are known.

Thus for example phenol cured insulating products are known. Phenol is a fairly inexpensive and also a rapidly curing binder. A phenol cured product resists temperatures up to 250° C., but the bonds are destroyed if the temperature is maintained above 250° C. for an extended period of time. At higher temperatures, at 400° C. and more, the binder loses its strength, the temperature increases rapidly and the product collapses. In addition, a phenol cured insulating product emits poisonous gases during burning. An additional and also major disadvantage is that the presence of phenol in the product will cause an undesired load on the environment when the binder-containing mineral wool product is to be disposed of after use.

Also water glass has been widely used as a binder. Water glass is traditionally made by melting silica sand with sodium or potassium carbonate at a very high temperature and then dissolving the finely divided solidified product in water. Thus water glass can be considered an ecologically acceptable substance to include as a binder e.g. in mineral wool products. A disadvantage is, however, that the manufacture thereof uses pure raw materials and is energy consuming.

It is also known to use a mixture of water glass and clay as a binder for mineral wool products, see e.g. SE 420 488. Such a product, although providing good water and heat resistance, has poor compression resistance, is brittle and causes dusting. The EP B 466 754 on the other hand describes the use of a binder made from slag and water glass for making a temperature and moisture resistant mineral wool product which is also capable of withstanding high temporary loads.

SUMMARY OF THE INVENTION

The object of the present invention is to provide an easy and economically feasible method for obtaining a binder, which has excellent binding and fire resistant properties and is acceptable from a use or labour hygiene point of view. In addition, the binder according to the invention can be manufactured from inexpensive and easily available raw materials, or by-products, in a simple manner. An important advantage is that the binder made according to the invention presents no excessive ecological load on the environment, but contains only such components that are already inherently present in nature.

The object of the present invention is thus a method for making a binder comprising the steps of (dissolving a particulate mineral material having a glassy amorphous structure in an aqueous solution to form a solution containing nucleated re-precipitated particles from the material,)

stabilizing the so obtained solution to (form a sol) having a desired particle size, and optionally adjusting the dry matter content of the sol.

The starting material for the binder can be a mineral wool material, especially a recirculated waste material from mineral wool production, as will be described in more detail below.

Another object of the present invention is a method for the production of a mineral wool product using the binder prepared according to the invention by contacting the binder with mineral fibres in order to bind the fibres to form a mineral wool product.

DETAILED DESCRIPTION OF THE INVENTION

According to a preferred embodiment of the invention, the particulate mineral material is a waste mineral wool product obtained from mineral wool production. Such waste material is formed in large quantities, typically up to 20–30% by weight of the starting raw material, in the form of spinning waste, unused fibers of rejected fibrous products (pre-consumer products). One applicable source for the material is also different constructions which will be taken down and in which mineral wool material has been used for instance as heat insulation (post-consumer products). Such a waste material is already in finely divided, typically fibrous form and can thus be used as such, or alternatively it can also be divided to an even finer form to provide a product with a large surface area, such as 0.4 $m^2$/g or larger, e.g. up to 25 $m^2$/g and thus has good dissolution properties in the aqueous solution. Fibres obtained from mineral wool production typically have a diameter of 0.5 to 20, usually 2 to 15 $\mu$m, preferably 3 to 5 $\mu$m as measured with OM or SEM using a suitable method (e.g. Koenig et al, Analytica Chimica Acta 1993 280 289–298; Christensen et al, AM IND HYG ASSOC (54) May 1993), and a length of 0.5 to 50, usually 2 to 20 mm, preferably 3 to 10 mm.

The aqueous solution can be an alkaline solution, such as an alkali metal or earth alkali metal hydroxide, carbonate or hydrocarbonate solution, especially a sodium, potassium or lithium hydroxide solution, or an ammonium hydroxide solution. Such a solution is preferably 0.1 to 2 molar with respect to the alkaline agent, or has a pH of 10 to 14, in order to easily dissolve also such mineral raw materials which are poorly soluble in neutral solutions.

The aqueous solution can also be an acidic solution, such as an aqueous solution made acidic by adding an inorganic or organic acid, such as HCl, $HNO_3$, $H_2SO_4$, $H_3PO_4$, formic, acetic, propionic acid or any other suitable mineralor organic acid. The pH of the solution is adjusted suitably. A low pH value results in a rapid dissolution of the mineral material and rapid gel formation, the gelling time being dependent on the pH, a lower pH resulting in a more rapid gelling than a higher pH. Good dissolution for a wide range of mineral materials is obtained at a pH of 0 to 6. The strength of the acid can be, depending on the acid used, from 0.1 to 10 M, typically 0.5 to 5 M.

According to a preferred embodiment, the dissolution of the raw material is preferably carried out at an increased temperature, such as at a temperature of 80 to 100° C., preferably while simultaneously stirring, in order to facilitate the dissolution process. Dissolution takes place within a period from 1–2 hours up to 20 hours depending on the dissolving medium and the solids content of the solution.

Preferably an amount of starting mineral material is dissolved in a solution to provide a metal oxide containing solution which advantageously contains over 1, preferably 5 to 60% by weight of dry matter, which is a suitable concentration for the subsequent use as the binder. After the dissolution is complete, the material nucleates and re-precipitates to form a sol with the desired particle size. (The subsequent stabilization of the sol is brought about by creating in the solution electrostatic repulsion between the particles. The electrostatic repulsion between the sol particles can be effected for example by providing suitable ions in the solution, or by changing the pH.) If necessary, additional water can be added or removed, e.g. by evaporation, if it is necessary, for example for adjusting the viscosity.

(Stabilization may also be achieved by using suitable surfactants and polymers, especially non-ionic ones.) Non-ionic surfactants and polymers can be preferred in some cases as they are not so sensitive to an environment which contains high concentrations of electrolytes and other chemicals, especially when the ionic strength is high. Examples of polymers are polyethylene oxide and polyethylene glycol, and examples of surfactants are nonylphenols, Tween and Span. In a typical situation, such surfactants and polymers are used in an amount of 0.5 to 2.5% by weight, calculated from the total solids of the solution.

At an alkaline pH the sol tends to be stable and an increase in sol particle size can be seen. By maintaining the sol at an alkaline pH for a suitable time, or by increasing the pH from appr. neutral to pH 10, an increase in particle size is obtained, the increase being less pronounced if the solution in addition contains salts. In the presence of sufficient quantities of salts, such as inorganic salts, e.g. sodium chloride, the sol particles tend to aggregate to form gels, which precipitate. The same gel formation will also take place by providing an acid pH to the solution, whereby a pH of appr. 2 to below 7 is suitable for gel formation.

Thus by adjusting the pH the sol state can be maintained, or the sol can be made to gel. The gel can be dispersed and stabilized by using high-shear mixing and raising the pH, and then again be brought to gelling by readjusting (lowering) the pH, or by the addition of an electrolyte.

According to the invention it is thus possible to provide sols containing predominantly silica in combination with other metal oxides stemming from the starting mineral material, such as calcium oxide, magnesium oxide, aluminium oxide, and possibly further metal oxides in smaller amounts. It is also possible to adjust the reaction conditions, such as pH, so as to obtain sols with a desired particle size. Silica sols typically can have a primary particle size of 1 to 1000 nm, whereas for the purposes of the invention a particle size of 10 to 100 nm is suitable. The sols so obtained can be made to gel either directly after sol formation, or preferably only immediately prior to application of the binder onto the mineral fibres. The sol can also be made to gel when heating or evaporating water when the final product is shaped.

When using the binder in mineral wool production, the preparation of the mineral wool product and the addition of the binder made according to the invention can take place conventionally in a conventional set of apparatuses. The binder can be added as a solution through a nozzle to the fibres in the wool chamber of a conventional machine line and distributed on the wool. The curing of the wool material carrying the binder takes place at once or later, at room temperature or at a raised temperature.

The binder solution can also contain possible additional curing, modifying, dust binding and/or hydrophobing agents, if desired or necessary.

The spraying of the binder solution and of the additives usually takes place directly after the fibre formation, preferably in the wool chamber. This is an advantage since the wool is in a virginal state at this point and is uncontaminated and has good adhesiveness.

The binder solution can be sprayed on the wool through the binder nozzles of the centrifuge, whereby it is possible to use both peripheral and central sprayers. It is also possible to use two or more different solutions to be fed onto the wool, so that possible modifying and/or additional curing agents are fed through one or more sprayers and the binder solution through a separate sprayer.

It is, however, also possible to apply the binder solution to the wool in a subsequent step of the production of the insulating material, for example by spraying it on the primary web on the conveyor, or even at a later stage. It is also possible to apply an additional binder in such a separate and later stage, thus obtaining a material with improved resistance and/or strength. Special properties can be given to the material by applying further additives to the web.

The amount of water fed to the wool with the binder is adjusted so as to provide on the one hand the correct viscosity for application purposes and on the other hand the correct moisture for the web and to prevent dusting. Any water evaporating from the wool in the wool chamber increases the viscosity of the binder applied to the fibre, whereby the primary web can retain its elasticity and curability for a long period of time.

The amount of binder generally is appr. 1 to 15, such as 1 to 5% by weight, calculated as dry substance, for a normal insulating product, but it is naturally possible to use higher and lower amounts depending on the desired product and the reactivity of the binder.

When producing insulating sheets, these are appropriately cut out from a mineral web, which has conventionally laid out by crosslapping a primary web to the desired thickness and then cured.

According to a preferred method, the mineral fibre web is cured at room temperature, for example between metal sheets. Such a sheet will acquire a better flexibility as a slowly cured fibre body is more flexible and elastic than a fibre body that has been cured at a high temperature.

According to another preferred embodiment, a secondary web having the desired thickness is taken up in an uncured state and stored in a non-curing environment, e.g. enclosed in a plastic wrapper at a suitable temperature and during a limited determined time. Such an insulating material is used in situ for insulation in places that are not easily accessable and have an awkward shape. After installation the insulation is allowed to cure at the prevailing temperature. It is relatively easy to apply an insulating material or mat having a suitable thickness onto or around various bodies which are difficult to access. The curing does not require any special measures or equipment since it takes place spontaneously at the prevailing temperature.

The method is also suitable for blow wool applications in which uncured fibre material torn into small tufts is applied and the wool cured at the prevailing temperature.

Also additional additives, such as additional curing, modifying, dust binding and hydrophobizing agents can be used.

According to the invention, an additional curing agent can consist of mineral salts and compounds, suitable acids, esters or alcohols or of combinations of these. The mineral salts can be e.g. magnesium, aluminium or calcium salts or compounds. Phosphoric acid, for instance, is a usable acid. Buffer curing agents can also be used for adjusting the storage time. The additional curing agent may be a combination of the above mentioned curing agents.

In case the binder is made by dissolving the mineral material in an alkaline solution, such as sodium hydroxide, thus providing a product of water glass type, but containing additional metal oxides, various modifying agents such as organic and inorganic polymers, cellulose and silicones, such as silicon organic polymers can be used as additives. Also monomers polymerized by e.g. a pH change or a temperature rise during the curing can be used. The said modifying agents have in common the fact of not being film forming. By means of the modifying agents one aims at increasing its adhesiveness to the fibre surface, and also improving the elastic properties, the water resistance, carbonation resistance etc. of the binder.

As dust binding agents, alcohols, polyols, film forming polymers, gelling polymers, waxes, resins, oils, fats, paraffines etc. can be used. The task of the dust binding agent is to bind together any dust or to bind it to the main matrice either physically (film forming) or chemically (surface active properties). In case high temperature curing is used, melting dust binding agents, e.g. stearates, can be used, or curing dust binders, forming a film over the matrice. A great number of the dust binding agents simultaneously have a water repellent effect.

The task of the hydrophobizing agent is to prevent water and moisture from penetrating into the product. As hydrophobizing agents, silanes, silicones, oils, various hydrophobic compounds and hydrophobic starch can be used.

A polybutene-silane composition has proved especially advantageous as a dust binding agent and a hydrophobing agent. The polybutene component acts as a dust binder and the silane component as a hydrophobing agent.

Within the various groups, compatible compounds can be mixed in advance, whereas incompatible compounds have to be mixed immediatedly before the application or applied through separate nozzles.

According to the invention it is also possible to use the binder obtained according to the invention for binding other materials, especially particulate mineral materials, especially in the manufacture of briquettes containing particulate mineral material. Such briquettes are especially suitable starting materials for mineral wool production, although also other briquettes uses are conceivable, such as any use where the excellent binding properties of the binder can be taken advantage of. Such a use can be, for example, in iron ore briquettes for iron manufacture.

The composition of the particulate mineral material to be used as raw material for making such briquettes naturally varies depending on the intended use of the briquettes. When the briquettes are to be used for mineral wool production, the particulate mineral material is chosen according to the desired chemical composition of the fibres to be produced. Suitable materials include any of the stone and other mineral materials normally used for this purpose, such as quartz sand, olivine sand, glass, basalt stone, slags, waste material from mineral wool production, lime stone, dolomite, wollastonite etc. The briquettes are made by simply mixing the mineral material with the binder, and if necessary, adding water to form a mixture of suitable stiffness. This mixture or mass can be formed into briquettes by compressionor compression vibration, using per se known techniques, and hardened in connection with the manufacturing process, or later. The hardening process can be accelerated for example by heating.

The amount of binder can easily be determined by a person skilled in the art. As an example it can be mentioned that when used as a binder in briquettes for mineral wool production, the amount of binder generally is appr. 1 to 15, such as 1 to 5% by weight, calculated as dry substance, of the dry weight of the product, but it is naturally possible to use higher and lower amounts depending on the desired product and the reactivity of the binder. When used as a binder in metal ore briquettes, a typical amount would be appr. 1 to 15, such as 1 to 5% by weight of the total weight of the batch. According to the invention, briquettes with good strength properties, including good green strength properties are obtained.

The following example illustrates the invention, without limiting the same.

EXAMPLE

The binder according to the invention can be prepared in the following way. 7.5 g of conventional rock wool fibres having a fibre diameter of 3 to 4 $\mu$m and a fibre length of 3 to 10 mm, are mixed with 100 ml of a 5M solution of formic acid. For the mixing a high-shear mixer should be used to ensure effective mixing and to speed up the dissolution process. The dissolution is usually complete in 1 to 2 hours. When the fibres are completely dissolved a small amount of polymer, such as polyethylene glycol with a molar mass of 1000 to 10000, is added, appr. 1% by weight based on the total solids content of the solution. During the addition of the polymer, the solution is constantly mixed to stabilize the formed particles. By altering the amount of polymer and the time of addition, i.e. the point of time when all fibres have dissolved, the size of the sol particles can be affected to obtain optimal gelling and binding properties. The colloidal particle sol is then kept under continuous mixing to ensure that the polymer adsorps to the surface of the particles.

When used as a binder for making mineral wool products, the binder so prepared can be applied by spraying onto mineral fibres in a conventional maner. The binder is cured and excess water is driven away by raising the temperature up to about 150° C.

The said binder can also be used as a binder in a briquette by mixing the binder with finely ground mineral raw material in a mixer, for example of Henschel type. It can be advantageous to add a small amount of water for forming the mixture in molds. Curing is obtained by raising the temperature, but also air drying is possible.

What is claimed is:
1. Method for making a binder comprising the steps of
    dissolving a particulate mineral material having a glassy amorphous structure in an aqueous solution, to form a solution containing nucleated re-precipitated particles from the material, and
    stabilizing the so obtained solution to form a sol having the desired particle size.
2. The method according to claim 1, wherein the particulate mineral material is a mineral wool material from mineral fibre production.
3. The method according to claim 1, wherein the solution is stabilized by means of a pH change or by changing the electrolytic character of the solution.

4. The method according to claim 1, wherein the solution is stabilized by means of surfactants and/or polymers.

5. The method according to claim 1, wherein the aqueous solution is an alkaline solution.

6. The method according to claim 5, wherein the alkaline solution is an alkali or ammonium, or an alkaline earth metal hydroxide, carbonate or hydrocarbonate solution.

7. The method according to claim 5 or 6, wherein the alkaline solution is a 0.1–2 molar alkaline solution.

8. The method according to any one of claims 1 to 4, wherein the aqueous solution is acidic, being a solution of an inorganic or organic acid.

9. The method acording to claim 1, wherein the stablized sol has a dry matter content of 5 to 60% by weight.

10. The method according to claim 1, wherein the particle size of the sol is approximately 1 to 1000 nm.

11. The method according to claim 1, wherein the dissolution takes place at a temperature of 80 to 100° C., preferably while stirring.

12. The method according to claim 1, wherein the sol obtained is made to form a gel prior to contacting the same with the material to be bonded.

13. The method according to claim 12, wherein the gel formation is brought about by affecting a pH change and/or by the addition of a salt.

14. The method according to claim 1, comprising an additional step of contacting the binder with a particulate mineral material, for the purpose of manufacturing a mineral wool product, or a raw material briquette for mineral wool production, or an iron ore briquette.

15. Method for the production of a mineral wool product comprising the steps of dissolving a particulate mineral material having a glassy amorphous structure in an aqueous solution, to form a solution containing nucleated re-precipitated particles from the material, stabilizing the so obtained solution to form a sol having the desired particle size to form a binder solution, and contacting the so obtained binder with mineral wool fibres to bind the same.

16. The method according to claim 15, wherein the sol obtained is made to form a gel prior to contacting the same with the mineral wool fibres.

17. The method according to claim 16, wherein the gel formation is brought about by affecting a pH change and/or by the addition of a salt.

18. The method according to claim 15, wherein the binder is contacted with the fibres immediately after fibre formation.

19. The method according to claim 15, wherein the binder is applied to a mineral wool web made from the fibres.

20. The method of claim 1, further comprising the step of adjusting the dry matter content of the sol.

21. The method according to claim 2, wherein the particulate mineral material is spinning waste, unused fibres or products, or post-consumer mineral fibre products.

22. The method according to claim 6, wherein the alkaline solution is selected from the group consisting of a sodium, potassium, lithium or ammonium, or calcium or magnesium hydroxide solution.

23. The method according to claim 8, wherein the aqueous solution contains an acid selected from $HCl$, $HNO_3$, $H_2SO_4$, $H_3PO_4$, formic, acetic and propionic acid.

24. The method according to claim 10, wherein the particle size of the sol is 10 to 100 nm.

25. The method for the production of a mineral wool according to claim 15, further comprising the step of:

adjusting the dry matter content of the binder solution.

* * * * *